Patented Aug. 11, 1953

2,648,620

UNITED STATES PATENT OFFICE 2,648,620

STICKING TOGETHER RESIN-IMPREG-
NATED CELLULOSIC SHEETS

Edward Sidney Hole, London, England

No Drawing. Application January 5, 1951, Serial
No. 204,694. In Great Britain January 31, 1950

10 Claims. (Cl. 154—138)

This invention relates to the sticking together of sheets of cellulosic material impregnated with artificial resins of the thermosetting type and in particular phenol-formaldehyde resins made from phenols or cresols, and the usual commercial forms of formaldehyde, commonly sold under the name Formalin. In making such sheet material paper in the nature of blotting paper is impregnated with the fluid thermosetting resin, and the sheets are dried. The preparation of such sheets of impregnated material is well known being described in my Patent No. 1,726,151, dated August 27, 1929, wherein the sheets are impregnated with the resin in an intermediate stage and then dried without substantial heating. The impregnated material so made is largely used in the preparation of matrices and printing plates in which the requisite depth is generally made up by superposing two or more sheets of such material before the moulding operation. The invention is not limited, however, to the sticking together of sheets of impregnated cellulosic material used for making printing plates and matrices, but it is applicable to the making up of such sheet material for any purpose by causing the resin to set while the sheets are subjected to heat and pressure.

The impregnated sheets are generally made thin because it is not easy to obtain uniformity in the impregnation if thick sheets are used, nor to secure accurate impressions when taking mouldings in such materials. It is preferable, therefore, to use thin impregnated sheet material, and to combine together several sheets to make up any required thickness. The thickness is reduced in the setting operation under heat and pressure, but, of course, this is allowed for in selecting the number of sheets of impregnated material initially required.

It is the principal object of this invention to enable several sheets of the impregnated material to be stuck together so as to make a composite pack of a given thickness which can be handled with ease in the moulding operation, and will give a moulded laminated product which will not tend to curl on drying and in which there is no tendency for the laminae to separate after setting. It has now been found that the desired result can be attained by using as an adhesive layer a mineral substance such as a metallic oxide or hydroxide, which is already gelatinised or which will gelatinise when mixed with water alone or with water and a suitable acid or acidic salt. There may then be added chalk or other ingredients and carbon black for example, the mixture being applied to one or both of the surfaces which are to be stuck together. The mixture may be applied by brushing, rolling, spraying or otherwise, according to its consistency, and when the sheets to which it is applied are pressed together and allowed to dry, with the use of gentle heating if desired, they will be found to adhere firmly after drying. The composite product consisting of a pack of impregnated sheets can then be easily handled for moulding or setting under the usual heat and pressure conditions, and the layers will not tend to separate after such setting. The superposed sheets may be subjected to pressure by passing them between hard rollers before they are dried, and this has the effect of causing the layer of adhesive to penetrate into the fibres of the cellulose, and into intimate contact with the plastic impregnant therein.

Moist aluminium hydroxide, a product containing freshly precipitated aluminum hydroxide gel, appears to be the simplest material to use as it is one which can be obtained already gelatinised and maintained in that condition by the presence of water, while it is not too sticky to handle in application, and does not lose its adhesion after drying. Another material, however, which can be used for this purpose is zinc oxide which also gelatinises, but is not so easy to handle and spread evenly, so that unless care is taken in application the composite sheets may tend to bend or curl in drying.

As examples of suitable mixtures which I have used, I may mention the following:

*Example 1*

|  | Ounces |
|---|---|
| Moist aluminium hydroxide | 5 |
| Chalk powder | 5 |
| Magnesium chromate | from ¼ to ½ |
| Water | 16 |

In this mixture acids or acidic salts other than magnesium chromate can be used to reduce the effect of the alkalinity of the other ingredients, and to give a more stable paste.

*Example 2*

|  | Ounces |
|---|---|
| Zinc oxide | 5 |
| Chalk powder | 5 |
| Magnesium chromate | from ¼ to ½ |
| Water | about 45 to 65 |

In this case the use of the magnesium chromate or other acidic salt assists in producing the gelatinisation of the zinc oxide. Chromic acid can also be used for this purpose.

In either case the ingredients are thoroughly stirred and mixed to a uniform consistency, and preferably allowed to stand for an hour or more before they are applied with a brush or by a pasting roller or other means, to the surfaces of the sheets which are to be stuck together. In the examples given above, the amount of chalk powder is equal to the amount of the oxide or hydroxide which gelatinises, but the proportions may be varied substantially while still securing satisfactory results. In either case filling materials, such as carbon black, may be added, and it is found that an addition of carbon black may enhance the adhesion of the two surfaces.

As regards the function of the acidic salt or acid incorporated in the mixture it may be mentioned that if alkaline elements are present, when the packs of sheets are being set by heat and pressure, as in the making of printing plates and matrices, these alkaline elements tend to find their way to the surfaces and may hinder the detachment of the set product from its mould. An acid salt is generally the best to use for neutralising any alkalinity, because a free acid may form a compound with calcium or magnesium and other oxides and carbonates. Magnesium chromate has been used because it is readily soluble in water, but chromic acid can also be used, although it will react with a small amount of the calcium or other oxides and carbonates present. When chromic acid is used there is a change in coloration of the mixture as the alkalinity is neutralised, and a very small addition is usually sufficient. When magnesium chromate is used the reaction probably takes place during the setting operation by heat and pressure. Chlorides, or hydrochloric acid, sulphates or sulphuric acid are not to be recommended as they tend to diminish adhesion and may cause blisters to form in the setting operation.

It is possible also to add to the mixtures a mineral ingredient which tends to act as a drier and to prevent the composite sheets from absorbing moisture both before and after the setting by heat and pressure. Magnesium carbonate or oxide, preferably light magnesium oxide, can be used for this purpose, as also can other non-hygroscopic oxides and salts. The amount added may be as small as 1 to 3 per cent.

It will be understood that the mineral material which gelatinises in the presence of water, such as moist aluminium hydroxide or zinc oxide or even a mixture of these, is the essential ingredient in making up the paste, and the other ingredients such as chalk, carbon black and an acidic salt or acid where used, are subject to wide variation or substitution. China clay when mixed with water, with or without carbon black, makes a paste which will hold the impregnated sheets together initially but, after setting by heat and pressure, the sheets are liable to separate again perhaps because of the silica present in the clay which does not seem to coalesce with the impregnant, so that china clay alone is not a satisfactory substitute although it may be added in small proportions to the moist aluminium hydroxide, zinc oxide or the like.

A weak solution of thermosetting resin, such as phenol-formaldehyde like that used for impregnating the paper, may be added to the mixture containing moist aluminium hydroxide or zinc oxide or both, and it may help in securing adhesion, but it is by no means essential for this purpose. The porosity and permeability of the adhesive mixture by the plastic impregnant in the sheets may be increased by adding to it a small amount of inert powder substance such as aluminium oxide (sometimes called diamantine) which may be of importance for some purposes, particularly when china clay is present because, when the artificial resin is being set by heat in the cellulosic layers, steam is evolved and cannot escape if the adhesive layer is not sufficiently porous in consistency, thus giving rise to blisters.

The proportions of water specified in the examples are what have been used when coating the sheets with a brush. When applied by a spray or a roller or other means the proportion of water may vary considerably, sometimes being no greater than the weight of the solid ingredients. In the claims "moist" is used to mean freshly prepared or in the state of an undried gel.

I claim:

1. Process for sticking together sheets of absorbent cellulosic material impregnated with a thermosetting phenol-formaldehyde resin, consisting in applying to the dry surfaces of the impregnated sheets which are required to adhere while said resin is in a reactive condition, a moist metallic compound of the class of aluminum oxide and zinc oxide and mixtures thereof gelatinised with water, pressing the sheets together and drying them slowly, thereby forming a composite laminated pack of sheets that can be handled conveniently and used for moulding and setting under the action of heat and pressure.

2. Process for sticking together sheets of absorbent cellulosic material impregnated with a thermosetting phenol-formaldehyde resin, consisting in applying to the dry surfaces of the impregnated sheets which are required to adhere while said resin is in a reactive condition, a moist metallic hydroxide of the class of aluminum oxide and zinc oxide and mixtures thereof gelatinised with water, pressing the sheets together and drying them slowly, thereby forming a composite laminated pack of sheets that can be handled conveniently and used for moulding and setting under heat and pressure.

3. Process for sticking together sheets of absorbent cellulosic material impregnated with a thermo-setting phenol-formaldehyde resin, consisting in applying to the dry surfaces of the impregnated sheets which are required to adhere while said resin is in a reactive condition, moist aluminium hydroxide gelatinised with water, pressing the sheets together and drying them slowly, thereby forming a composite laminated pack of sheets that can be handled conveniently and used for moulding and setting under heat and pressure.

4. Process for sticking together sheets of absorbent cellulosic material impregnated with a thermo-setting phenol-formaldehyde resin, consisting in rendering zinc oxide gelatinous with water and an acid ingredient, and applying the moist gelatinised product so obtained to the dry surfaces of the impregnated sheets which are to be united while said resin is in a reactive condition, pressing the sheets together and drying them slowly, thereby forming a composite laminated pack of sheets that can be handled conveniently and used for moulding and setting under the action of heat and pressure.

5. Process for sticking together sheets of absorbent cellulosic material impregnated with a thermo-setting phenol-formaldehyde resin, consisting in applying to the dry surfaces of the impregnated sheets which are required to adhere while said resin is in a reactive condition, a moist metallic compound of the class of aluminum oxide and zinc oxide and mixtures thereof gelatinised with water together with chalk powder and an acid ingredient, pressing the sheets together and drying them slowly, thereby forming a composite laminated pack of sheets that can be handled conveniently and used for moulding and setting under the action of heat and pressure.

6. Process for sticking together sheets of absorbent cellulosic material impregnated with a thermosetting phenol-formaldehyde resin, consisting in applying to the dry surfaces of the impregnated sheets which are required to adhere while said resin is in a reactive condition, moist aluminium hydroxide gelatinised with water together with chalk powder and carbon black, pressing the sheets together and drying them slowly, thereby forming a composite laminated pack of sheets that can be handled conveniently and used for moulding and setting under heat and pressure.

7. Process for sticking together sheets of absorbent cellulosic material impregnated with a thermosetting phenol-formaldehyde resin, consisting in applying to the dry surfaces of the impregnated sheets which are required to adhere while said resin is in a reactive condition, moist aluminium hydroxide gelatinised with water together with chalk powder and light magnesium oxide, pressing the sheets together and drying them slowly, thereby forming a composite laminated pack of sheets that can be handled conveniently and used for moulding and setting under heat and pressure.

8. Process for sticking together sheets of absorbent cellulosic material impregnated with a thermosetting phenol-formaldehyde resin, consisting in applying to the dry surfaces of the impregnated sheets which are required to adhere while said resin is in a reactive condition, moist aluminium hydroxide gelatinised with water together with chalk powder and a weak solution of a thermo-setting resin, pressing the sheets together and allowing them to dry, thereby forming a composite laminated pack of sheets that can be handled conveniently and used for moulding and setting under heat and pressure.

9. Process for sticking together sheets of absorbent cellulosic material impregnated with a thermosetting phenol-formaldehyde resin in a dry but reactive condition, consisting in applying to the dry surfaces of the impregnated sheets which are required to adhere a gelatinized aqueous mixture of moist aluminium hydroxide, zinc oxide, and small amounts of magnesium chromate and carbon black, pressing the sheets together and drying them slowly, thereby forming a composite laminated pack of sheets that can be handled conveniently and used for moulding and setting under heat and pressure.

10. Process for sticking together sheets of absorbent cellulosic material impregnated with a thermo-setting phenol-formaldehyde resin in a dry but reactive condition consisting in applying to the dry surfaces of the impregnated sheets which are required to adhere a gelatinized aqueous mixture of a metallic compound of the class of aluminium hydroxide and zinc oxide with chalk powder in equal amounts and a smaller amount of magnesium chromate, pressing the sheets together and drying them slowly, thereby forming a composite laminated pack of sheets that can be handled conveniently and used for moulding and setting under heat and pressure.

EDWARD SIDNEY HOLE.

References Cited in the file of this patent

UNITED STATES PATENTS

| Number | Name | Date |
|---|---|---|
| 1,377,510 | Novotny | May 10, 1921 |
| 2,443,197 | Rhodes | June 15, 1948 |
| 2,444,347 | Greger | June 29, 1948 |
| 2,451,410 | Queeny | Oct. 12, 1948 |